US012284504B2

(12) United States Patent
Kim et al.

(10) Patent No.: US 12,284,504 B2
(45) Date of Patent: Apr. 22, 2025

(54) SPEAKER

(71) Applicant: LG ELECTRONICS INC., Seoul (KR)

(72) Inventors: Kihun Kim, Seoul (KR); Seungharк Paek, Seoul (KR); Heuisik Seo, Seoul (KR); Jongwoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 251 days.

(21) Appl. No.: 18/028,101

(22) PCT Filed: Sep. 24, 2020

(86) PCT No.: PCT/KR2020/012965
§ 371 (c)(1),
(2) Date: Mar. 23, 2023

(87) PCT Pub. No.: WO2022/065548
PCT Pub. Date: Mar. 31, 2022

(65) Prior Publication Data
US 2023/0336919 A1 Oct. 19, 2023

(51) Int. Cl.
*H04R 7/12* (2006.01)
*H04R 9/06* (2006.01)
*H04R 31/00* (2006.01)

(52) U.S. Cl.
CPC ............... *H04R 7/127* (2013.01); *H04R 9/06* (2013.01); *H04R 31/00* (2013.01)

(58) Field of Classification Search
CPC .......... H04R 7/127; H04R 9/06; H04R 31/00; H04R 1/345; H04R 1/30; H04R 31/006; H04R 2201/34; H04R 1/2865; H04R 2400/13; H04R 2231/003
See application file for complete search history.

(56) References Cited

U.S. PATENT DOCUMENTS 8,121,316 B2 * 2/2012 Dodd ........................ H04R 1/30 381/186
2004/0237286 A1 12/2004 Button et al.
2006/0034475 A1 2/2006 Geddes
2006/0153412 A1 * 7/2006 Chang ........................ H04R 9/02 381/396
2015/0319515 A1 11/2015 Devantier et al.
(Continued)

FOREIGN PATENT DOCUMENTS

JP 2011-244050 A 12/2011

*Primary Examiner* — Tuan D Nguyen
(74) *Attorney, Agent, or Firm* — Birch, Stewart, Kolasch & Birch, LLP

(57) ABSTRACT

A speaker including a speaker enclosure including an upper surface, a lower surface and a side surface connecting the upper and lower surfaces; a diaphragm disposed in an inner accommodating space of the speaker enclosure and configured to generate sound waves by vibrating according to an electrical signal; a first phase plug spaced apart from the diaphragm; and a second phase plug spaced apart from the first phase plug and forming a guide path to guide the generated sound waves from the diaphragm to be emitted omnidirectionally from the side surface of the speaker enclosure, wherein a width of the guide path formed by the first phase plug and the second phase plug increases towards the side surface of the speaker enclosure.

17 Claims, 12 Drawing Sheets

(56) References Cited

U.S. PATENT DOCUMENTS

| | | | |
|---|---|---|---|
| 2018/0359559 | A1 | 12/2018 | Bisset et al. |
| 2019/0005941 | A1 | 1/2019 | Sterling |
| 2019/0028801 | A1 | 1/2019 | Chen |

* cited by examiner

[FIG. 1]
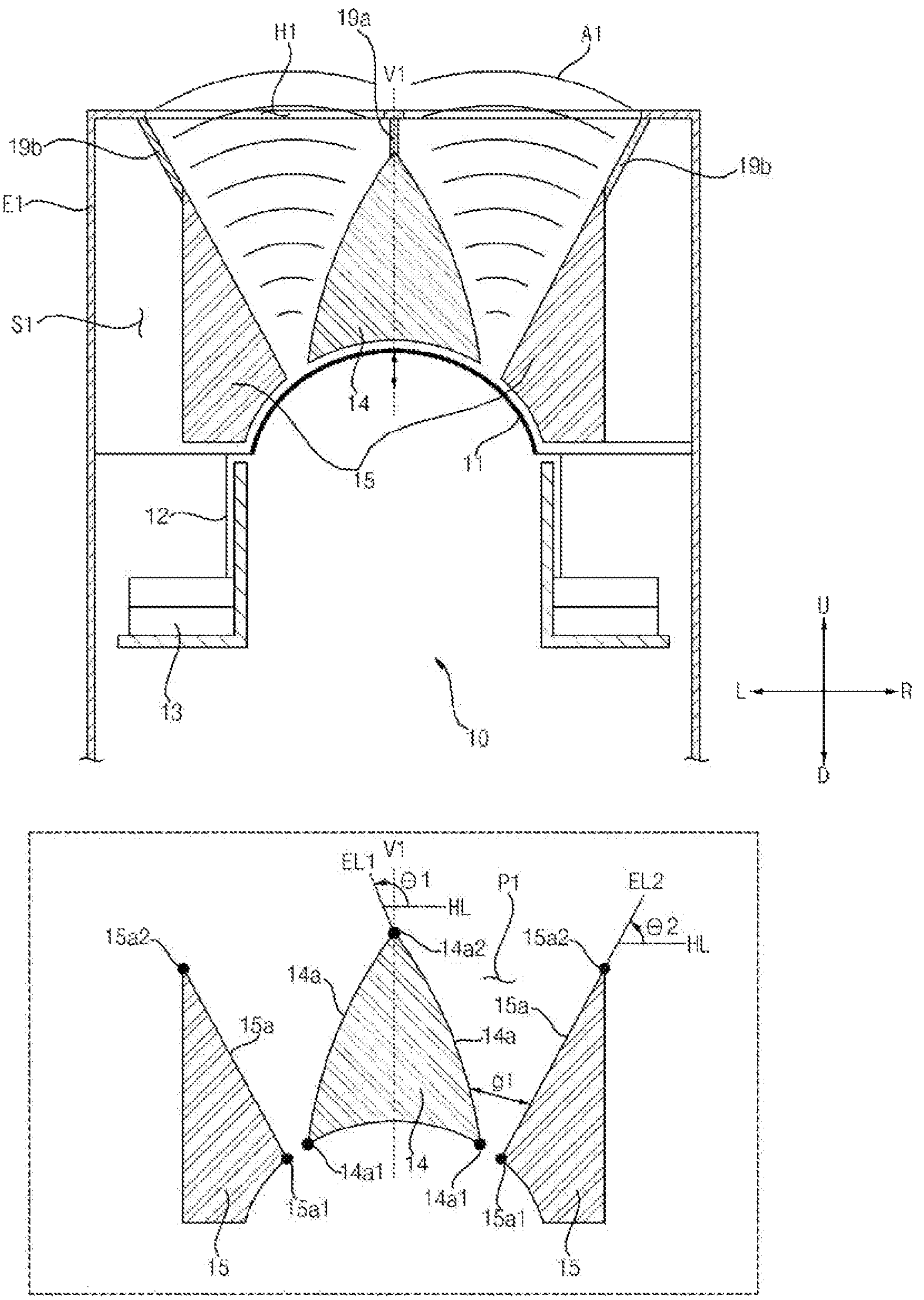

[FIG. 2]
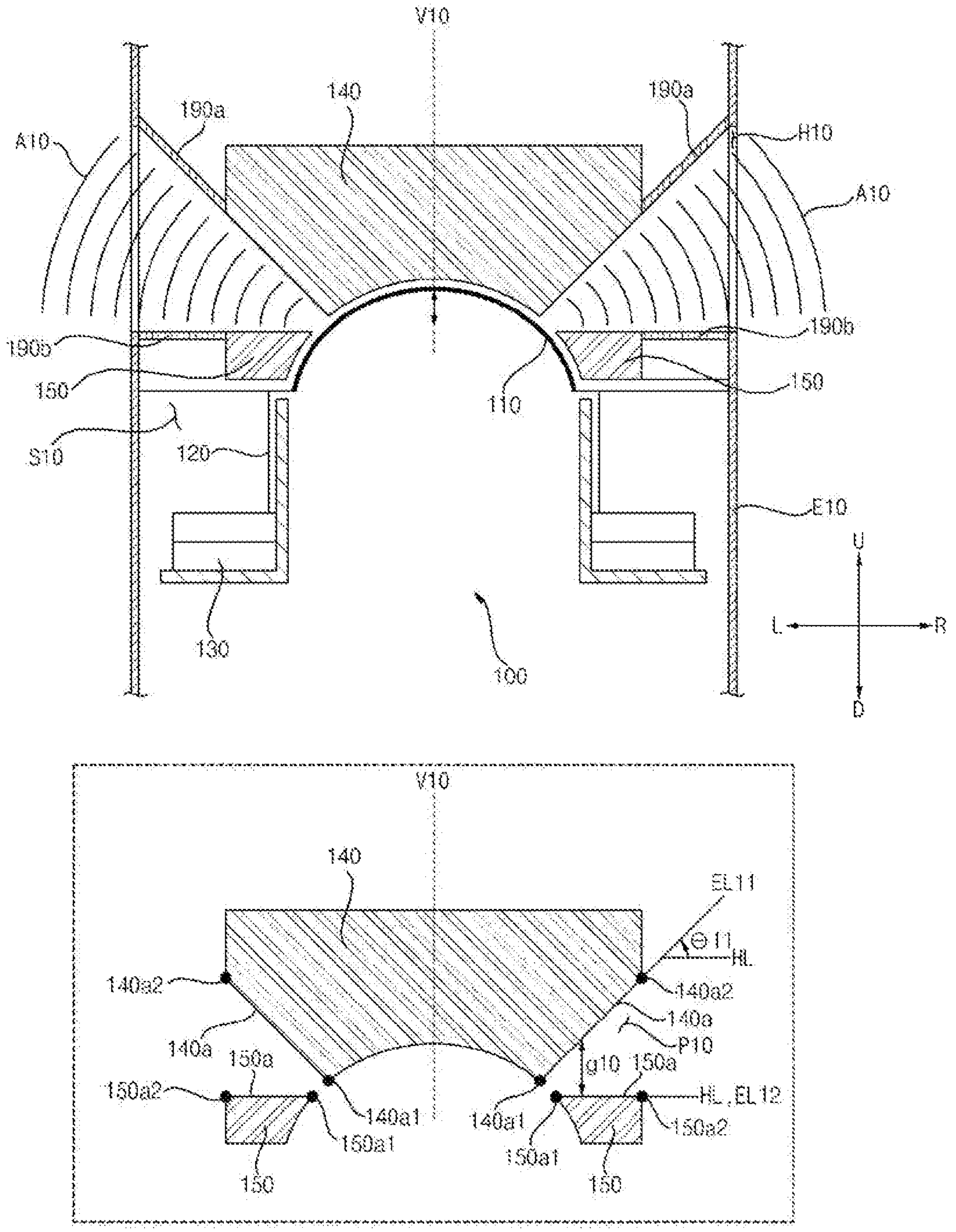

[FIG. 3]
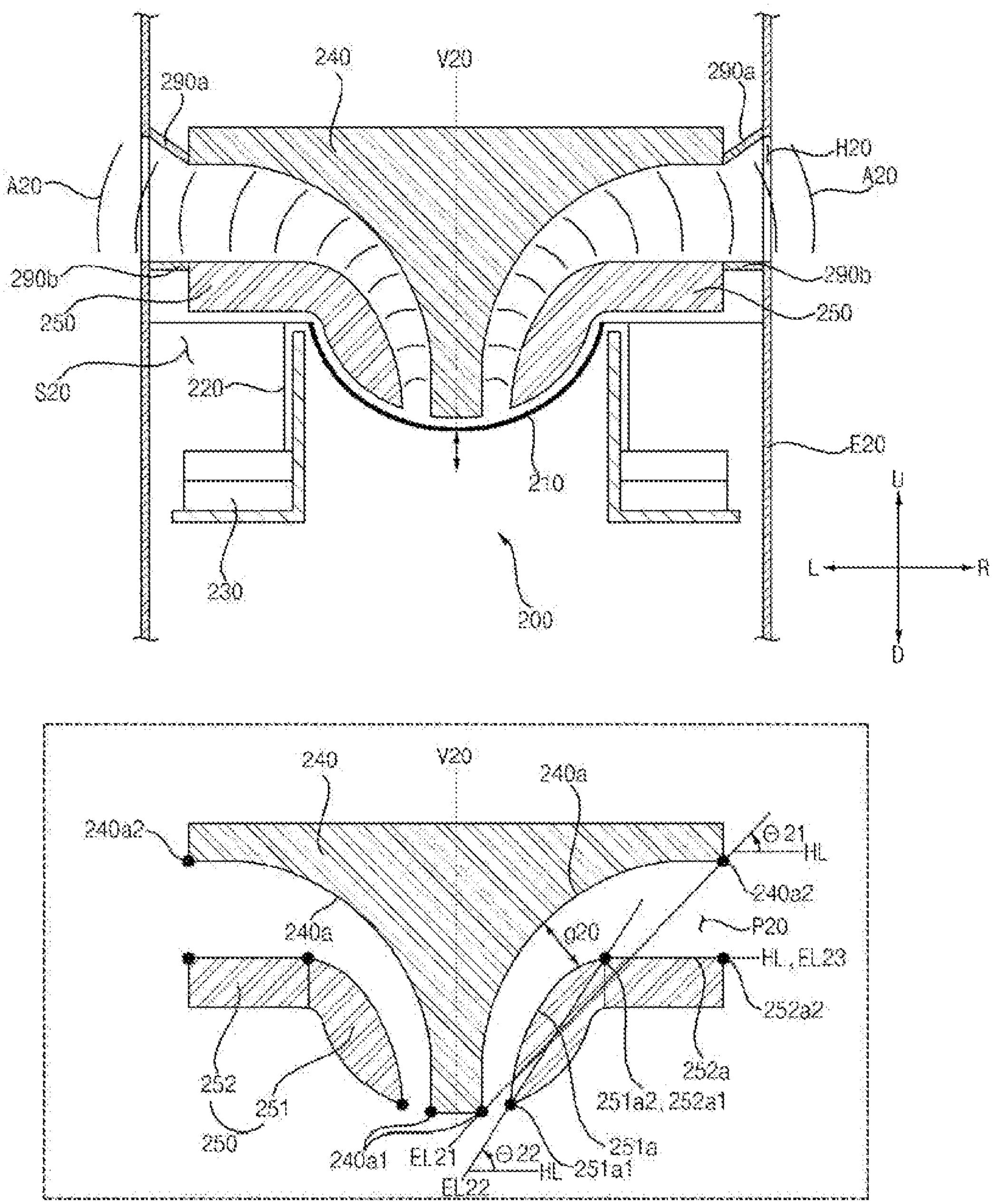

[FIG. 4]
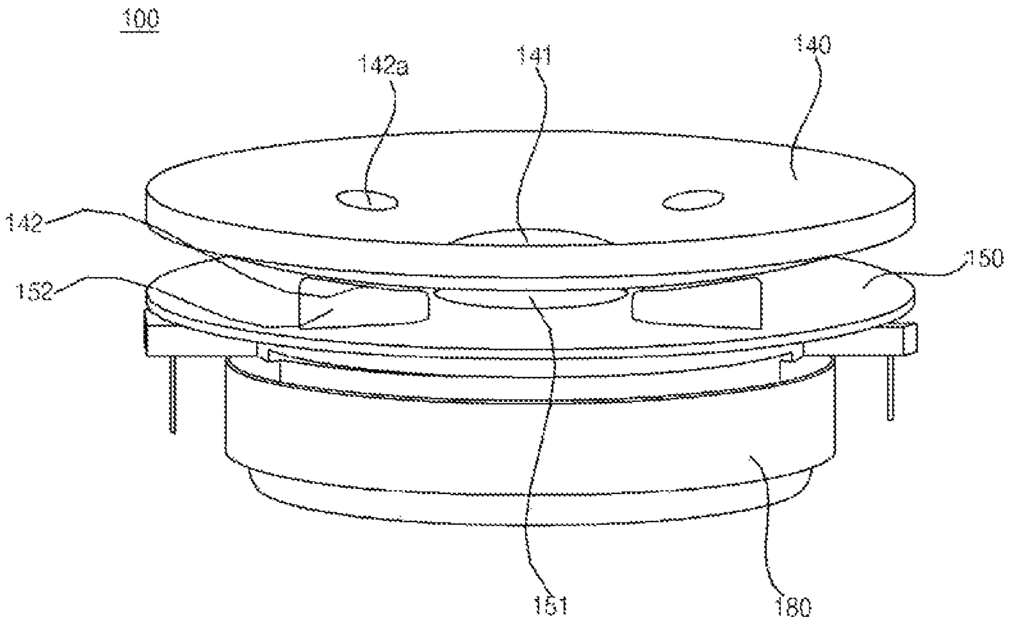

[FIG. 5]
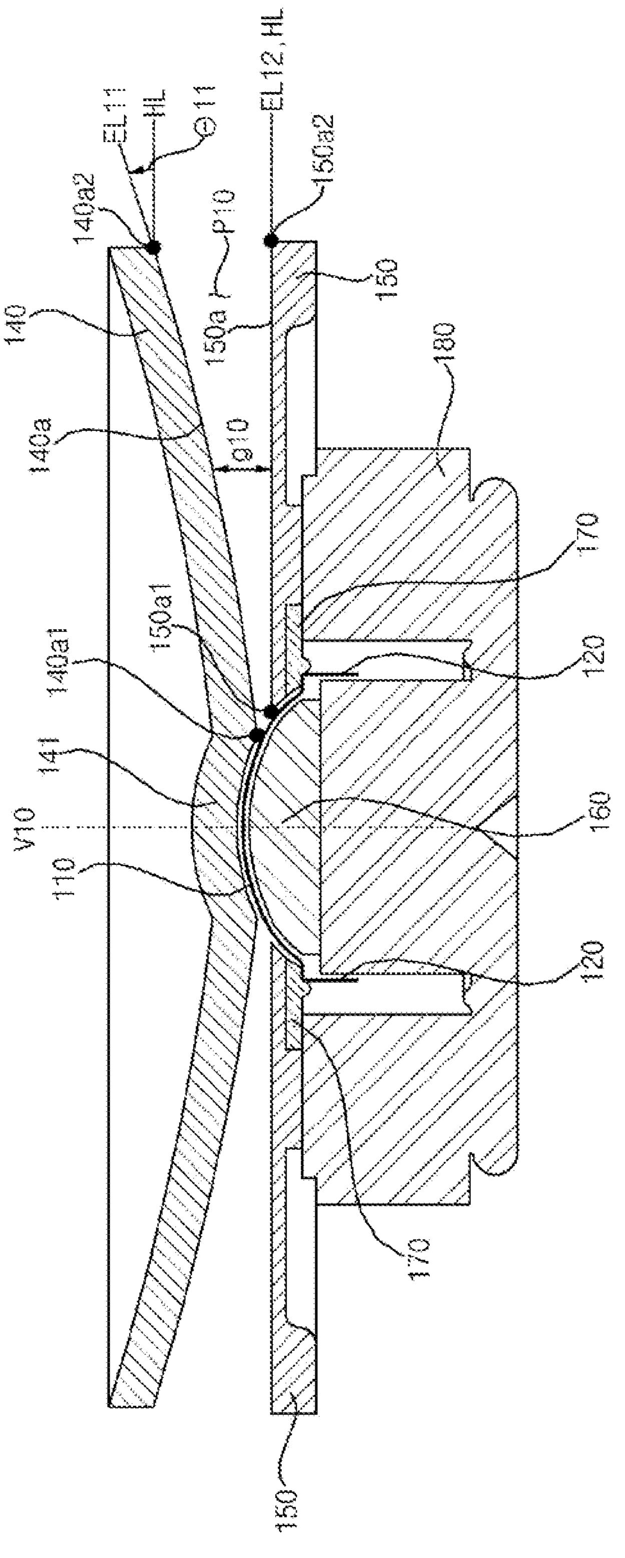

[FIG. 6]
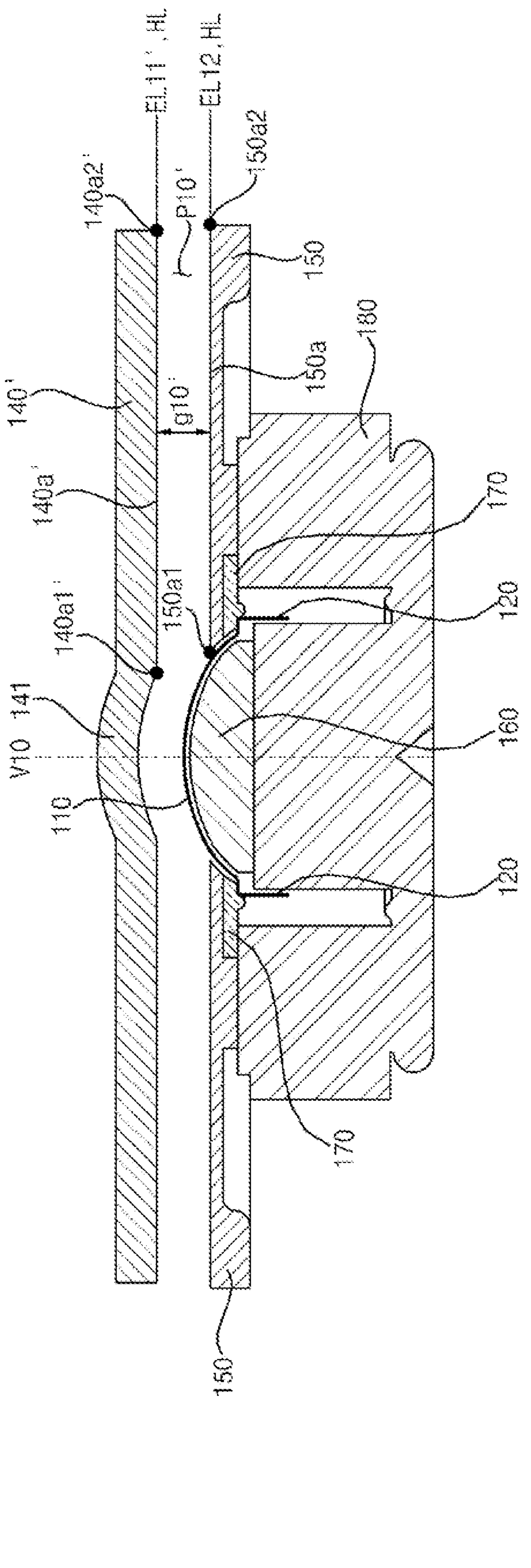

[FIG. 7]
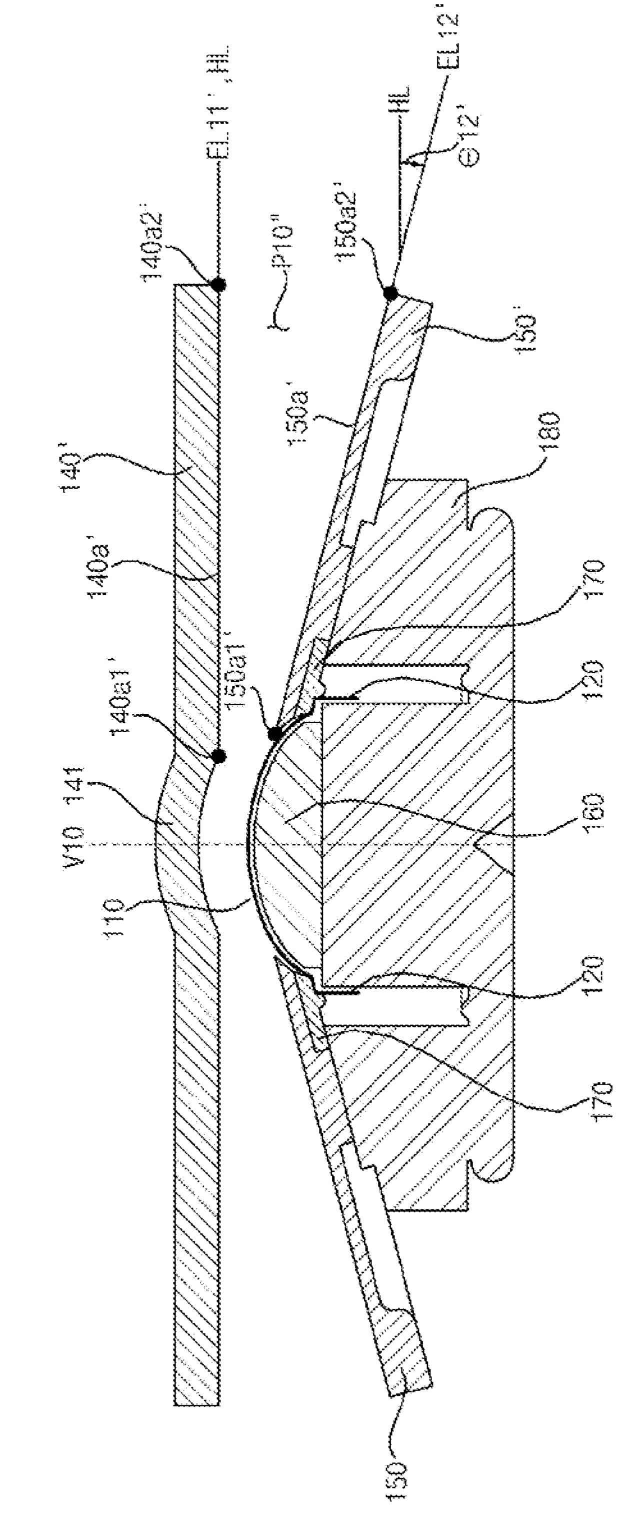

[FIG. 8]
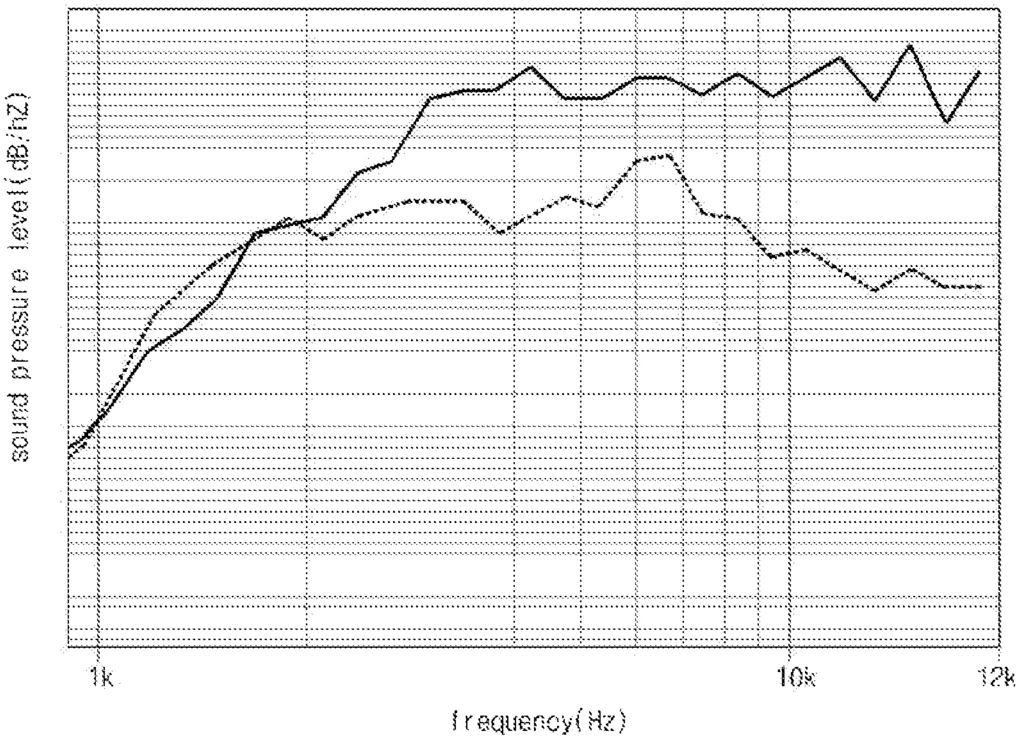

[FIG. 9]
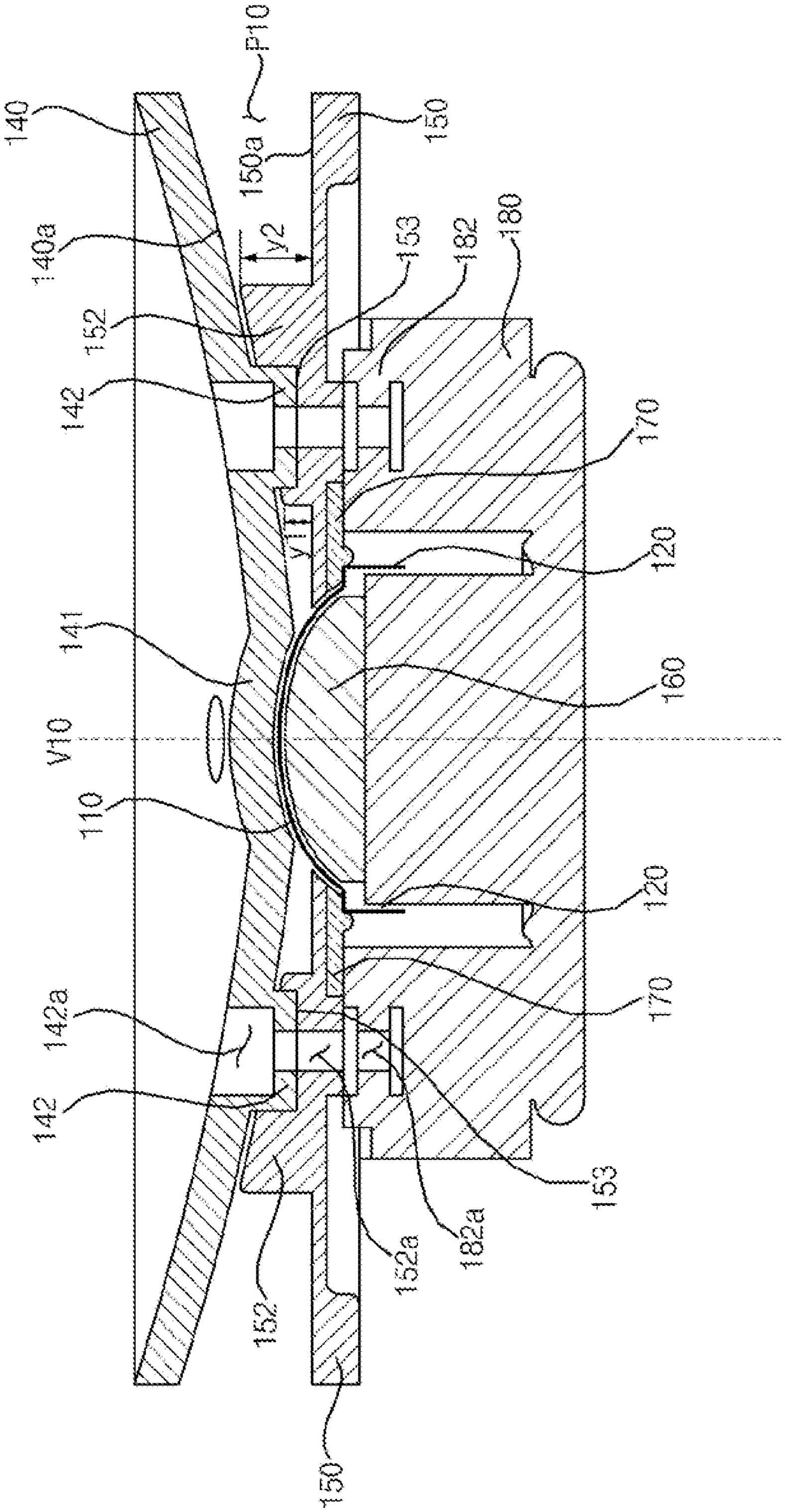

[FIG. 10]
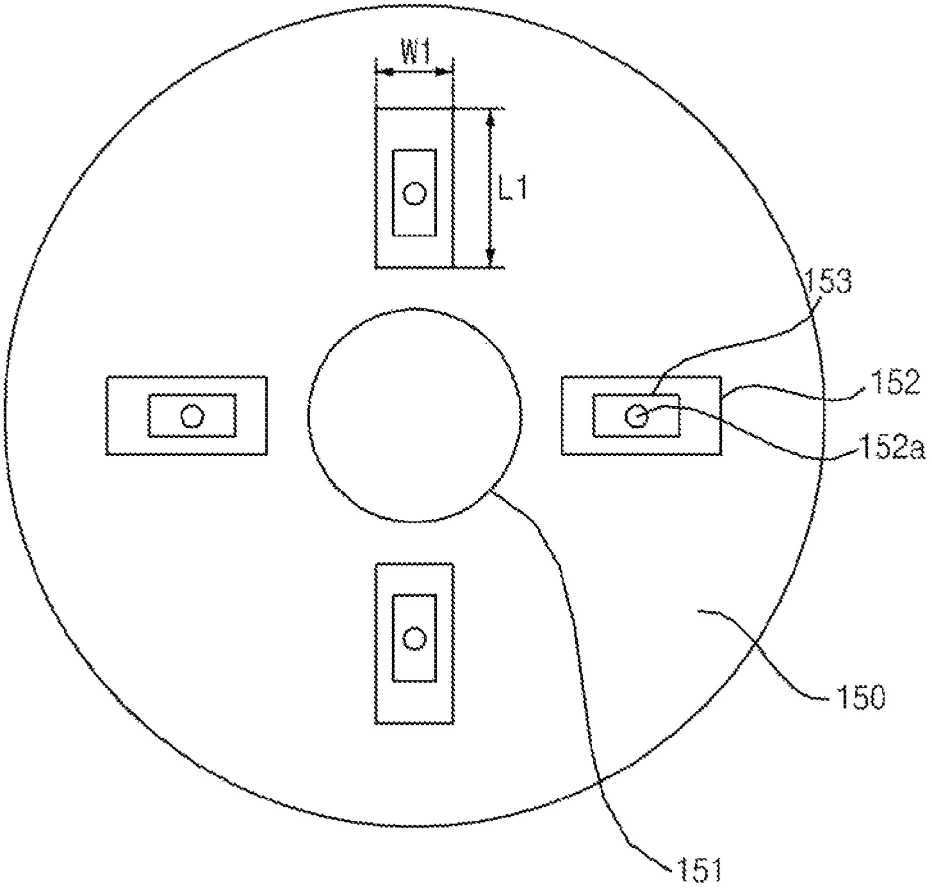

[FIG. 11]
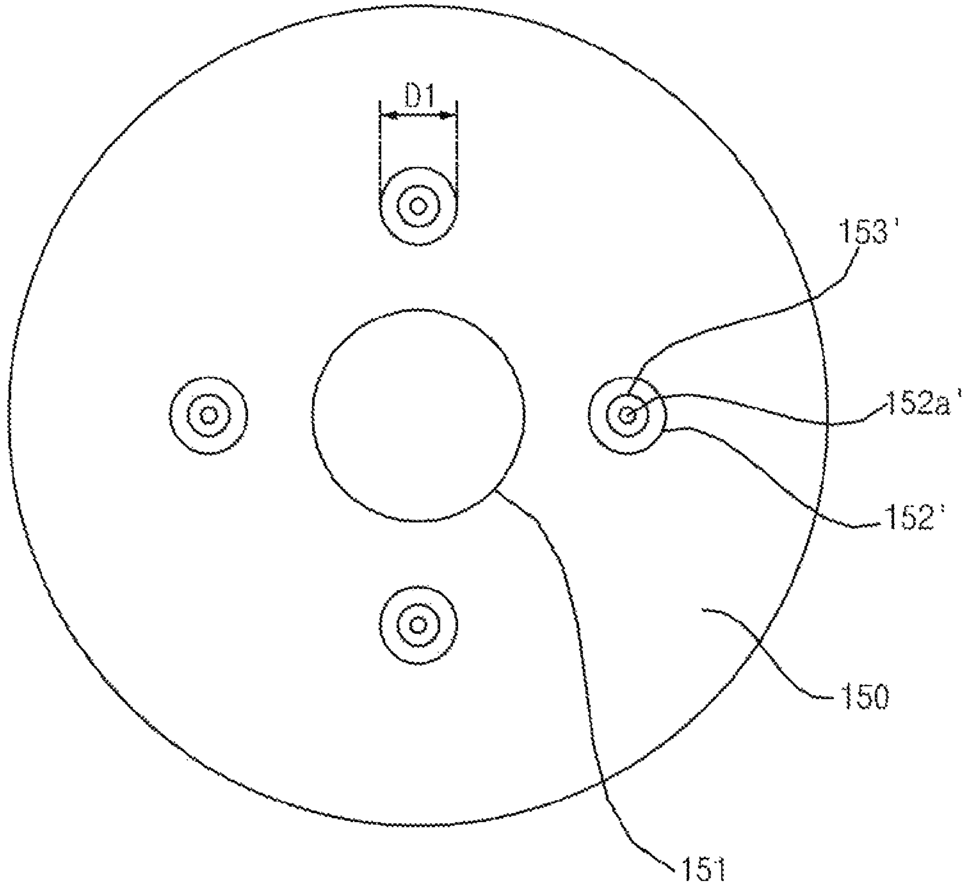

[FIG. 12]
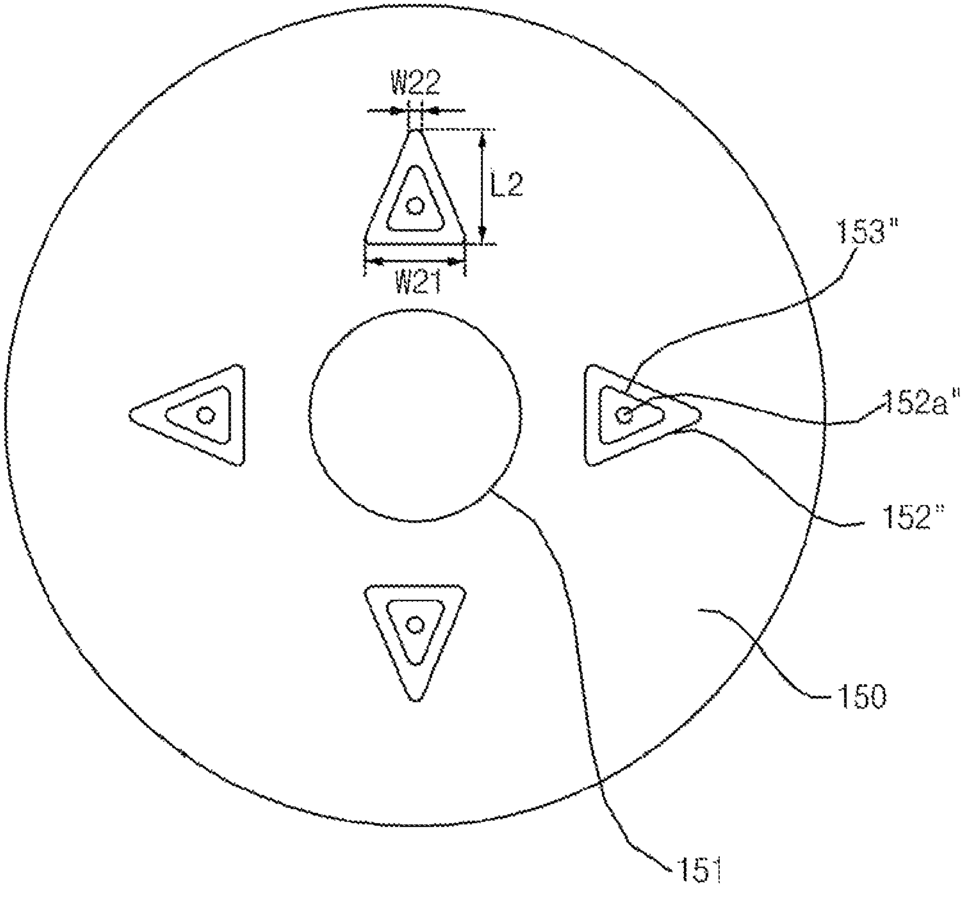

SPEAKER

CROSS REFERENCE TO RELATED APPLICATION

This application is the National Phase of PCT International Application No. PCT/KR2020/012965, filed on Sep. 24, 2020, which is hereby expressly incorporated by reference into the present application.

BACKGROUND OF THE INVENTION

Technical Field

The present disclosure relates to a speaker. In particular, the present disclosure relates to a speaker having a compression driver.

Discussion of the Related Art

A speaker converts an electric sound signal into a sound wave and outputs the sound wave, and can be used alone or connected to various devices such as display devices and electronic devices. The speaker can also subdivided into a woofer, a midrange, and a tweeter according to a sound range.

A compression driver is installed inside a speaker enclosure to generate a sound and sound generated by the compression driver is output to the outside through a speaker hole formed in the enclosure. Recently, many studies have been conducted on a method capable of providing sound of a certain quality regardless of a listener's relative position to a speaker.

SUMMARY OF THE INVENTION

It is an objective of the present disclosure to solve the above and other problems.

Another object is to provide a speaker capable of providing sound in all directions in a horizontal direction.

Another object is to provide a speaker that has a slim structure while providing sound in all directions.

In accordance with an aspect of the present invention, a speaker includes a diaphragm formed in a dome shape and capable of vibrating; a phase plug spaced apart from the diaphragm and covering a portion of an upper surface of the diaphragm, the phase plug including an upper phase plug and a lower phase plug spaced apart from each other; and a path formed between the upper phase plug and the lower phase plug, wherein the path is formed in all directions in a horizontal or side direction.

Advantageous Effects of Invention

The speaker according to the present disclosure has the following effects. According to at least one of the embodiments of the present disclosure, a speaker capable of providing sound in all directions in a horizontal direction can be provided. According to at least one of the embodiments of the present disclosure, a speaker that has a slim structure while providing sound in all directions may further provided.

Further scope of applicability of the present disclosure will become apparent from the detailed description given hereinafter. However, it should be understood that the detailed description and specific examples, while indicating preferred embodiments of the present disclosure, are given by illustration only, since various changes and modifications within the spirit and scope of the present disclosure will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 1 is an overview illustrating a speaker according to an embodiment of the invention;

FIG. 2 is an overview illustrating a speaker according to another embodiment of the present disclosure;

FIG. 3 is an overview illustrating a speaker according to yet another embodiment of the invention;

FIG. 4 is an overview illustrating a compression driver of a speaker according to embodiment of the present disclosure;

FIG. 5 is a cross-sectional view illustrating a speaker according to an embodiment of the invention;

FIG. 6 is cross-sectional view illustrating a speaker according to another embodiment of the present disclosure;

FIG. 7 is cross-sectional view illustrating a speaker according to still another embodiment of the present disclosure;

FIG. 8 is a graph illustrating a sound pressure level of a speaker according to another embodiment of the present disclosure;

FIG. 9 is cross-sectional view illustrating a speaker according to yet another embodiment of the present disclosure;

FIG. 10 is an overview illustrating a phase plug of a speaker according to another embodiment of the present disclosure;

FIG. 11 is an overview illustrating a phase plug of a speaker according to another embodiment of the present disclosure; and FIG. 12 is an overview illustrating a phase plug of a speaker according to still another embodiment of the present disclosure.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components can be denoted by the same reference numbers, and description thereof will not be repeated.

In general, suffixes such as "module" and "unit" can be used to refer to elements or components. Use of such suffixes herein is merely intended to facilitate description of the specification, and the suffixes do not have any special meaning or function. In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. can be used herein to describe various elements, these elements should not be limited by these terms. These terms are only used to distinguish one element from another. It will be understood that when an element is referred to as being "connected with" another element, there can be intervening elements present. In contrast, it will be understood that when an element is referred to as being "directly connected with" another element, there are no intervening elements present.

A singular representation can include a plural representation unless context clearly indicates otherwise. In the following description, even if embodiments are described with reference to a specific drawing, if necessary, reference numerals that do not appear in the specific drawing can be referred to, and the reference numerals that do not appear in the specific drawing are used when the reference numerals appear in the other figures.

Referring to FIG. 1, a speaker can include an enclosure E1 and a compression driver 10. The enclosure E1 has a shape such as a square cylinder or a cylinder, and a speaker hole H1 through which a sound A1 is output can be formed in an upper surface of the enclosure E1.

The compression driver 10 can be installed in an inner accommodating space S1 of the enclosure E1. The compression driver 10 can generate sound and the sound generated by the compression driver 10 can be output to the outside through the speaker hole H1. The compression driver 10 also converts electrical energy into a sound wave. As shown, the compression driver 10 can include a diaphragm 11, a voice coil 12, a permanent magnet 13, and a phase plug 14, 15.

The diaphragm 11 can be vibrated according to an electrical signal to generate a wave of condensation. For example, the diaphragm 11 can be formed in an upwardly convex dome shape. In this instance, the voice coil 12 can be disposed adjacent to the permanent magnet 13, and be connected to the diaphragm 11 to vibrate the diaphragm 11 (see the bidirectional arrow). In addition, the diaphragm 11 can be referred to as a trembler or a vibratile membrane.

The phase plug 14, 15 can be spaced apart from the diaphragm 11 and cover a part of the upper surface of the diaphragm 11. The phase plug 14, 15 can include an upper phase plug 14 covering a central portion of the diaphragm 11, and a lower phase plug 15 that is spaced apart from the upper phase plug 14 and covers a part of the outside area the central portion of the diaphragm 11. In this instance, the lower phase plug 15 can have a shape symmetrical about a vertical axis V1 extending vertically while passing through the center of the upper phase plug 14.

The upper phase plug 14 is spaced apart from the diaphragm 11 at a regular interval, and can have a compression surface formed in the same shape as a part of the upper surface of the diaphragm 11 covered by the upper phase plug 14. The lower phase plug 15 is spaced apart from the diaphragm 11 at a regular interval, and can have a compression surface formed in the same shape as a part of the upper surface of the diaphragm 11 covered by the lower phase plug 15. In this instance, the compression surface of the upper phase plug 14 can be spaced apart from the compression surface of the lower phase plug 15.

Further, sound waves are generated according to the vibration of the diaphragm 11 and are compressed between the diaphragm 11 and the compression surfaces of the phase plug 14, 15. In addition, a path P1 guides the compressed sound wave to the speaker hole H1. Here, the path P1 can be formed between the upper phase plug 14 and the lower phase plug 15. Specifically, the path P1 can be formed between a first surface 14*a* of the upper phase plug 14 and a second surface 15*a* of the lower phase plug 15.

The first surface 14*a* can be formed by rotating a straight line connecting the first point 14*a*1 and the second point 14*a*2 located on a first extension line ELL or a curve that is convex downward or upward with respect to the straight line about the vertical axis V1. Here, the first extension line EL1 can be inclined at a first angle theta 1, which is an obtuse angle with respect to a horizontal line HL parallel to the left-right direction, and can extend long. In other words, the first surface 14*a* can form a side surface of a cone.

The second surface 15*a* can be formed by rotating a straight line connecting a first point 15*a*1 and a second point 15*a*2 located on a second extension line EL2 about the vertical axis V1. Here, the second extension line EL2 can be inclined at a second angle theta 2, which is an acute angle with respect to the horizontal line HL. In other words, the second surface 15*a* can form a side surface of an inverse-cone.

In addition, an opening formed between the first point 14*a*1 of the first surface 14*a* and the first point 15*a*1 of the second surface 15*a* can be referred to as a slot. Further, the path P1 can be formed from the diaphragm 11 toward the upper side of the speaker. A distance g between the first surface 14*a* and the second surface 15*a*, which is the width of the path P1, can increase toward the upper side of the path P1.

Accordingly, the sound A1 generated in the compression driver 10 can be output to the upper side of the speaker via the path P1 and the speaker hole H1. In addition, a horn 19*a*, 19*b* can be installed between the phase plug 14, 15 and the enclosure E1 to form a space continuously connected to the path P1.

Referring to FIG. 2, the speaker can include an enclosure E10 and a compression driver 100. The enclosure E10 can have a shape such as a square cylinder or a cylinder, and a speaker hole H10 through which a sound A10 is output can be formed in a side surface of the enclosure E10.

The compression driver 100 can be installed in an inner accommodating space S10 of the enclosure E10. The compression driver 100 can generate sound and the sound generated by the compression driver 100 can be output to the outside through the speaker hole H10. The compression driver 100 can convert electrical energy into a sound wave. In this instance, the compression driver 100 can include a diaphragm 110, a voice coil 120, a permanent magnet 130, and a phase plug 140, 150.

The diaphragm 110 can be vibrated according to an electrical signal to generate a wave of condensation. For example, the diaphragm 110 can be formed in an upwardly convex dome shape. In this instance, the voice coil 120 can be disposed adjacent to the permanent magnet 130, and be connected to the diaphragm 11 to vibrate the diaphragm 110 (see the bidirectional arrow). In addition, the diaphragm 110 can be referred to as a trembler or a vibratile membrane.

The phase plug 140, 150 can be spaced apart from the diaphragm 110 and cover a part of the upper surface of the diaphragm 110. The phase plug 140, 150 can include an upper phase plug 140 covering the center of the diaphragm 110, and a lower phase plug 150 that is spaced apart from the upper phase plug 140 and covers a part of the outside area the center of the diaphragm 110. In this instance, the lower phase plug 150 can have a shape symmetrical about a vertical axis V1 extending vertically while passing through the center of the upper phase plug 140.

The upper phase plug 140 is spaced apart from the diaphragm 110 at a regular interval, and can have a compression surface formed in the same shape as a part of the upper surface of the diaphragm 110 covered by the upper phase plug 140. The lower phase plug 150 is spaced apart from the diaphragm 110 at a regular interval, and can have a compression surface formed in the same shape as a part of the upper surface of the diaphragm 110 covered by the lower phase plug 150. In this instance, the compression surface of the upper phase plug 140 can be spaced apart from the compression surface of the lower phase plug 150.

Further, sound waves are generated according to the vibration of the diaphragm 110 and can be compressed between the diaphragm 110 and the compression surfaces of the phase plug 140, 150. In addition, a path P10 may guide the compressed sound wave to the speaker hole H10. Here, the path P10 can be formed between the upper phase plug 140 and the lower phase plug 150. Specifically, the path P10 can be formed between a first surface 140*a* of the upper phase plug 140 and a second surface 150*a* of the lower phase plug 150.

The first surface 140*a* can be formed by rotating a straight line connecting the first point 140*a*1 and the second point 104*a*2 located on a first extension line EL11, or a curve that is convex downward or upward with respect to the straight line about the vertical axis V10. Here, the first extension line EL11 can be inclined at a first angle theta 11 which is an acute angle with respect to a horizontal line HL parallel to the left-right direction. In other words, the first surface 140*a* can form a side surface of an inverse-cone.

The second surface 150*a* can be formed by rotating a straight line connecting a first point 150*a*1 and a second point 150*a*2 located on a second extension line EL12 about the vertical axis V10. Here, the second extension line EL12 can extend in a direction parallel to the horizontal line HL. In other words, the second surface 150*a* can form an upper surface of a ring.

In addition, an opening formed between the first point 140*a*1 of the first surface 140*a* and the first point 150*a*1 of the second surface 150*a* can be referred to as a slot. Further, a part of the path P10 can surround a part of the diaphragm 110 in the horizontal direction. In addition, the path P10 can be formed from the diaphragm 110 toward the side surface of the speaker. A gap g10 between the first surface 140*a* and the second surface 150*a*, which is the width of the path P10, can increase toward the side surface of the speaker.

Accordingly, the sound A10 generated by the compression driver 100 can be output to the side surface of the speaker through the path P10 and the speaker hole H10. Further, as the speaker hole H10 is formed along the circumference of the side surface of the speaker, the speaker can be provided as an omnidirectional speaker capable of outputting sound A10 in 360° in a horizontal direction. In addition, the horn 190*a*, 19*b* can be installed between the phase plug 140, 150 and the enclosure E11) to form a space continuously connected to the path P10.

Referring to FIG. 3, the speaker can include an enclosure E20 and a compression driver 200. The enclosure E20 can have a shape such as a square cylinder or a cylinder, and a speaker hole H20 through which a sound A20 is output can be formed on a side surface of the enclosure E20.

The compression driver 200 can be installed in an inner accommodating space S20 of the enclosure E20. The compression driver 200 may generate sound. The sound generated by the compression driver 200 can be output to the outside through the speaker hole H20. The compression driver 200 can convert electrical energy into a sound wave. In this instance, the compression driver 200 can include a diaphragm 210, a voice coil 220, a permanent magnet 230, and a phase plug 240, 250.

The diaphragm 210 can be vibrated according to an electrical signal to generate a wave of condensation. For example, the diaphragm 210 can be formed in a downwardly convex dome shape. In this instance, the voice coil 220 can be disposed adjacent to the permanent magnet 230, and be connected to the diaphragm 210 to vibrate the diaphragm 210 (see the bidirectional arrow). In addition, the diaphragm 210 can be referred to as a trembler or a vibratile membrane.

The phase plug 240, 250 can be spaced apart from the diaphragm 210 and cover a part of the upper surface of the diaphragm 210. The phase plug 240, 250 can include an upper phase plug 240 covering the center of the diaphragm 210, and a lower phase plug 250 that is spaced apart from the upper phase plug 240 and covers a part of the outside area the center of the diaphragm 210. In this instance, the lower phase plug 250 can have a shape symmetrical about a vertical axis V20 extending vertically while passing through the center of the upper phase plug 240.

The upper phase plug 240 is spaced apart from the diaphragm 210 at a regular interval, and can have a compression surface formed in the same shape as a part of the upper surface of the diaphragm 210 covered by the upper phase plug 240. The lower phase plug 250 is spaced apart from the diaphragm 210 at a regular interval, and can have a compression surface formed in the same shape as a part of the upper surface of the diaphragm 210 covered by the lower phase plug 250. In this instance, the compression surface of the upper phase plug 240 can be spaced apart from the compression surface of the lower phase plug 250.

Further, sound waves are generated according to the vibration of the diaphragm 210 and can be compressed between the diaphragm 210 and the compression surfaces of the phase plug 240, 250. In addition, a path P20 can guide the compressed sound wave to the speaker hole H20. Here, the path P20 can be formed between the upper phase plug 240 and the lower phase plug 250. Specifically, the path P20 can be formed between a first surface 240*a* of the upper phase plug 240 and a second surface 250*a* of the lower phase plug 250.

The first surface 240*a* can be formed by rotating a curve that is convex upward with respect to a first extension line EL21 while connecting the first point 240*a*1 and the second point 240*a*2 located on the first extension line EL21, about the vertical axis V20. Here, the first extension line EL21 can be inclined at a first angle (theta 21) which is an acute angle with respect to a horizontal line HL parallel to the left-right direction.

The second surface 250*a* can include a second-first surface 251*a* formed in a first part 251 of the lower phase plug 250 and a second-second surface 252*a* formed in a second part 252 of the lower phase plug 250. Here, the first part 251 forms the compression surface of the lower phase plug 250 and can be adjacent to the diaphragm 210. In addition, the second part 252 can be connected to the first part 251 and can be adjacent to the speaker hole H20.

The second-first surface 251*a* can be formed by rotating a curve that is convex upward with respect to a second extension line EL22 while connecting the first point 251*a*1 and the second point 251*a*2 located on the second extension line EL22, about the vertical axis V20. Here, the second extension line EL22 can be inclined at a second angle (theta 22) that is an acute angle with respect to the horizontal line HL parallel to the left-right direction.

The second-second surface 252*a* can be formed by rotating a straight line connecting a first point 252*a*1 and a second point 252*a*2 located on a third extension line EL23, about the vertical axis V20. In other words, the second-second surface 252*a* can form an upper surface of a ring.

In addition, an opening formed between the first point 240*a*1 of the first surface 240*a* and the first point 251*a*1 of the second-first surface 251*a* can be referred to as a slot. Further, the diaphragm 210 surrounds a part of the path P20 in the horizontal direction. In addition, the path P20 can be formed by bending from the diaphragm 210 toward the side surface of the speaker. A gap g20 between the first surface 240*a* and the second surface 250*a*, which is the width of the path P20, can increase toward the side surface of the speaker.

Accordingly, the sound A20 generated by the compression driver 200 can be output to the side surface of the speaker through the path P20 and the speaker hole H20. Further, as the speaker hole H20 is formed along the circumference of the side surface of the speaker, the speaker can be provided as an omnidirectional speaker capable of outputting sound A20 in 360° in a horizontal direction. In addition, the horn 290*a*, 290*b* can be installed between the phase plug 240, 250 and the enclosure E20 to form a space continuously connected to the path P20.

In addition, as the compression driver 200 described with reference to FIG. 3 has a dome-shaped diaphragm 210 convex downward, it is preferable that the path P20 is bent upward in some sections, and the length of the path P20 can be longer than that of the compression driver 100 described with reference to FIG. 2.

Referring to FIGS. 4 and 5, the upper phase plug 140 can include a compression part 141 that is formed convex upward from the upper phase plug 140 and has the compression surface of the upper phase plug 140. In addition, the compression driver 100 can include a top plate 170, a bottom plate 180, and an inner phase plug 160.

The top plate 170 can be adjacent to the diaphragm 110, and disposed between the lower phase plug 150 and the bottom plate 180. The bottom plate 180 can form a lower surface of the compression driver 100. The aforementioned voice coil 120 can be disposed in the inner space of the bottom plate 180. The bottom plate 180 can be coupled to the lower phase plug 150 at a lower side of the lower phase plug 150.

The inner phase plug 160 can be disposed inside the bottom plate 180. The inner phase plug 160 can have a surface formed in the same shape as at least a part of the lower surface of the diaphragm 110. The inner phase plug 160 can be spaced apart from the diaphragm 110 at a regular interval at the lower side of the diaphragm 110.

Referring to FIG. 6, a path P10' can guide a compressed sound wave. The pass P10' can be formed between a first surface 140*a*' of an upper phase plug 140' and the second surface 150*a* of the lower phase plug 150. The first surface 140*a*' can be formed by rotating a straight line connecting the first point 140*a*1' and the second point 140*a*2' located on a first extension line EL11', or a curve that is convex downward or upward with respect to the straight line about the vertical axis V10. Here, the first extension line EL11' can extend in a direction parallel to the horizontal line HL. In other words, the first surface 140*a*' can form a lower surface of a ring.

In this instance, the first surface 140*a*' and the second surface 150*a* can be parallel to each other. A gap g10' between the first surface 140*a*' and the second surface 150*a*, which is the width of the path P10', can be maintained constant. Accordingly, the sound A10' generated by the compression driver 100' can be intensively output in a direction perpendicular to the side surface of the speaker through the path P10' and the speaker hole H10.

Referring to FIG. 7, a path P10" guides a compressed sound wave. The path P10" can be formed between the first surface 140*a*' of the upper phase plug 140' and the second surface 150*a*' of the lower phase plug 150'.

The second surface 150*a*' can be formed by rotating a straight line connecting the first point 150*a*1' and the second point 150*a*2' located on a second extension line EL12', or a curve that is convex downward or upward with respect to the straight line, about the vertical axis V10. Here, the second extension line EL12' can be inclined at a second angle (theta 12') which is an acute angle with respect to the horizontal line HL.

In this instance, the second surface 150*a*' can be inclined downward with respect to the first surface 140*a*'. A gap g10' between the first surface 140*a*' and the second surface 150*a*', which is the width of the path P10", may increase toward the side surface of the speaker. Accordingly, the sound A10" generated by the compression driver 100" can be output to the side surface and bottom of the speaker through the path P10" and the speaker hole H10.

Referring to FIG. 8, when the sound generated by the compression driver is detected at the side surface of the speaker, the detected sound pressure level varies according to the shape of the path. The first extension line (EL11; EL21; EL11') and/or the second extension line (EL12; EL22; EL12') described above with reference to FIGS. 2 to 7 can be inclined at an angle of 45° or less with respect to the horizontal line HL and extended long. In this instance, the sound pressure level of the sound sensed at the side surface of the speaker with respect to the frequency of the sound generated by the compression driver is shown as a solid line in FIG. 8.

The first extension line (EL11; EL21; EL11') and/or the second extension line (EL12; EL22; EL12') described above with reference to FIGS. 2 to 7 can be inclined at an angle exceeding 45° with respect to the horizontal line HL. In this instance, the sound pressure level of the sound sensed at the side surface of the speaker with respect to the frequency of the sound generated by the compression driver is indicated by a dotted line in FIG. 8.

Further, in an area where the frequency of the sound generated by the compression driver is about 3.5 kHz or higher, the sound pressure level is detected higher when the first extension line (EL11; EL21; EL11') and/or the second extension line (EL12; EL22; EL12') are inclined at an angle of 45° or less with respect to the horizontal line HL compared to a case of tilting at an angle exceeding 45°. Accordingly, the first extension line (EL11; EL21; EL11') and/or the second extension line (EL12; EL22; EL12') are preferably inclined at an angle of 45° or less with respect to the horizontal line HL.

Referring to FIG. 9, the upper phase plug 140 can include an upper boss 142 protruding downward from the lower surface of the upper phase plug 140. The lower phase plug 150 can include a lower boss 152 protruding upward from an upper surface of the lower phase plug 150.

For example, a part of the upper boss 142 can be inserted into the lower boss 152. Further, the lower boss 152 can have a seating portion 153 on which the upper boss 142 is seated. Further, a hole 142*a*, 152*a*, and 182*a* through which a fastening member such as a bolt or a screw pass can be formed in the upper boss 142, the lower boss 152, and the bottom plate 180, respectively. Accordingly, the upper phase plug 140 can be detachably coupled to the lower phase plug 150 through a fastening member.

In addition, the upper surface of the lower boss 152 can be spaced apart from or in contact with the lower surface of the upper phase plug 140. The upper surface of the lower boss 152 can extend along the first surface 140*a* of the upper phase plug 140, and the lower surface can extend along the second surface 150*a* of the lower phase plug 150.

In addition, one end of the lower boss 152 can be adjacent to the diaphragm 110 and have a first height y1. The other end of the lower boss 152 can be opposite to the first end and have a second height y2 greater than the first height y1. The height of the loss boss 152 can increase from one end to the other end.

Referring to FIG. 10, the lower phase plug 150 can have a hole 151 into which a part of the diaphragm 110 is inserted. A plurality of lower bosses 152 can be provided. For example, the plurality of lower bosses 152 can be formed on an upper surface of the lower phase plug 150, and can be disposed at a regular interval in the circumferential direction of the lower phase plug 150.

A cross section of each of the plurality of lower bosses 152 can be formed in a rectangular shape as a whole. Each of the plurality of lower bosses 152 can extend as long as a first length L1 in the radial direction of the lower phase plug 150. In addition, each of the plurality of lower bosses 152 can have a first width w1 in the circumferential direction of the lower phase plug 150. In this instance, the first width w1 can be maintained constant in the radial direction of the lower phase plug 150.

Referring to FIG. 11, a plurality of lower bosses 152' can be provided. For example, the plurality of lower bosses 152' can be formed on the upper surface of the lower phase plug 150, and can be disposed at a regular interval in the circumferential direction of the lower phase plug 150.

A cross section of each of the plurality of lower bosses 152' can be formed in a circular shape as a whole. A cross section of each of the plurality of lower bosses 152' can have a first diameter D1. Further, it is preferable to form the first diameter D1 to be small in order to minimize the resistance of the sound guided along the path P10.

Referring to FIG. 12, a plurality of lower bosses 152" can be provided. For example, the plurality of lower bosses 152' can be formed on the upper surface of the lower phase plug 150, and can be disposed at a regular interval in the circumferential direction of the lower phase plug 150.

A cross section of each of the plurality of lower bosses 152" can be formed as a triangle having a rounded corner as a whole. Each of the plurality of lower bosses 152" can extend as long as a second length L2 in the radial direction of the lower phase plug 150. In addition, one end of each of the plurality of lower bosses 152" can be spaced apart from the hole 151 by a first distance, and have a first width w21 in the circumferential direction of the lower phase plug 150.

The other end of each of the plurality of lower bosses 152" can be spaced apart from the hole 151 by a second distance greater than the first distance, and can have a second width w22 smaller than the first width w21 in the circumferential direction of the lower phase plug 150. A width of each of the plurality of lower bosses 152" can decrease from one end toward the other end. Accordingly, the width of the lower boss gradually decreases in the sound output direction, so that acoustic resistance due to a boss can be minimized.

According to an aspect of the present disclosure, there is provided a speaker including a diaphragm formed in a dome shape and capable of vibrating; a phase plug spaced apart from the diaphragm and covering a portion of an upper surface of the diaphragm, the phase plug including an upper phase plug and a lower phase plug spaced apart from each other; and a path formed between the upper phase plug and the lower phase plug, wherein the path is formed in all directions in a horizontal direction.

In addition, according to another aspect of the present disclosure, the upper phase plug can cover a central portion of the upper surface of the diaphragm, and the lower phase plug can cover a part of an outer area of the central portion of the upper surface of the diaphragm.

In addition, according to another aspect of the present disclosure, the lower phase plug can have a shape symmetrical about a vertical axis extending vertically while passing through a center of the upper phase plug. In addition, according to another aspect of the present disclosure, the path can be formed between a first surface of the upper phase plug extending from a portion covering a part of the diaphragm of the upper phase plug and a second surface of the lower phase plug extending from a portion covering a part of the diaphragm of the lower phase plug, wherein each of the first surface and the second surface can be formed by rotating a straight line or a curve about the vertical axis.

According to another aspect of the present disclosure, the diaphragm can be formed convex upward with respect to a horizontal line, and a part of the path may surround a part of the diaphragm in a horizontal direction. Also, the first surface can be inclined upward by a first angle with respect to a horizontal line and may extend, the second surface may extend in a direction parallel to a horizontal line, and the first angle can be an angle of 45° or less. The first surface can extend in a direction parallel to a horizontal line, and the second surface can extend in a direction parallel to a horizontal line.

In addition, according to another aspect of the present disclosure, the first surface can extend in a direction parallel to a horizontal line, the second surface can be inclined downward by a second angle with respect to a horizontal line and extends, and the second angle can be an angle of 45° or less. Further, the diaphragm can be formed convex downward with respect to a horizontal line, and the diaphragm can surround a part of the path in a horizontal direction.

Also, the first surface can be formed to be convex upward with respect to a first extension line that is inclined upward by a first angle with respect to a horizontal line, in which the second side can further include a second-first surface formed to be convex upward with respect to a second extension line that is inclined upward by a second angle with respect to a horizontal line; and a second-second surface connected to the second-first surface and extending in a direction parallel to a horizontal line. Also, each of the first angle and the second angle can be an angle of 45° or less.

In addition, according to another aspect of the present disclosure, the upper phase plug and the lower phase plug can be spaced apart from each other in an up-down direction, in which the upper phase plug can further include an upper boss protruding downward from a lower surface of the upper phase plug. Further, the lower phase plug can include a lower boss protruding upward from an upper surface of the lower phase plug, and each of the upper boss and the lower boss can have a hole through which a fastening member passes.

In addition, according to another aspect of the present disclosure, the lower boss into which at least a part of the upper boss can be inserted. The lower boss can have a first width in a circumferential direction of the lower phase plug.

Further, the lower phase plug can have a hole into which a part of the diaphragm is inserted, one end of the lower boss can be spaced apart from the hole by a first distance and can have a first width in a circumferential direction of the lower phase plug, the other end of the lower boss can be spaced apart from the hole by a second distance greater than the first distance and can have a second width smaller than the first width in a circumferential direction of the lower phase plug. In addition, according to another aspect of the present disclosure, a cross section of the lower boss can be formed in a circular shape.

Certain embodiments or other embodiments of the disclosure described above are not mutually exclusive or distinct from each other. Any or all elements of the embodiments of the disclosure described above can be combined or combined with each other in configuration or function.

For example, a configuration "A" described in one embodiment of the disclosure and the drawings and a configuration "B" described in another embodiment of the disclosure and the drawings can be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A speaker comprising:

a speaker enclosure including an upper surface, a lower surface and a side surface connecting the upper and lower surfaces;

a diaphragm disposed in an inner accommodating space of the speaker enclosure and configured to generate sound waves by vibrating according to an electrical signal;

a first phase plug spaced apart from the diaphragm; and a second phase plug spaced apart from the first phase plug and forming a guide path to guide the generated sound waves from the diaphragm to be emitted omnidirectionally from the side surface of the speaker enclosure, wherein a width of the guide path formed by the first phase plug and the second phase plug increases towards the side surface of the speaker enclosure.

2. The speaker of claim 1, wherein the first phase plug covers a central portion of an upper surface of the diaphragm, and wherein the second phase plug covers an outer portion outside of the central portion of the upper surface of the diaphragm.

3. The speaker of claim 2, wherein the second phase plug has a shape symmetrical about a vertical axis extending vertically through a center of the first phase plug, and wherein the guide path is formed between a first surface of the first phase plug and a second surface of the second phase plug.

4. The speaker of claim 3, wherein each of the first surface and the second surface comprises a straight surface angled from the vertical axis, or wherein each of the first surface and the second surface comprises a curved surface angled from the vertical axis.

5. The speaker of claim 4, wherein the diaphragm comprises an upward convex shape with respect to a horizontal axis perpendicular to the vertical axis.

6. The speaker of claim 5, wherein the first surface is inclined upward by an angle with respect to the horizontal axis, wherein the second surface extends in a direction parallel to the horizontal axis, and wherein the angle is 45° or less.

7. The speaker of claim 5, wherein the first surface extends in a direction parallel to the horizontal axis, wherein the second surface is inclined downward by an angle with respect to the horizontal axis, and wherein the angle is 45° or less.

8. The speaker of claim 4, wherein the diaphragm comprises a downward convex shape with respect to a horizontal axis perpendicular to the vertical axis.

9. The speaker of claim 8, wherein the first surface comprises an upward convex shape with respect to a first extension line inclining upward by a first angle with respect to the horizontal line, wherein the second surface further comprises:

a second-first surface comprising an upward convex shape with respect to a second extension line inclining upward by a second angle with respect to the horizontal axis; and a second-second surface connected to the second-first surface and extending in a direction parallel to the horizontal axis, and wherein each of the first angle and the second angle is an angle of 45° or less.

10. The speaker of claim 1, wherein the first phase plug and the second phase plug are spaced apart from each other in an up-down direction, wherein the first phase plug further comprises an upper boss protruding downward from a lower surface of the first phase plug, wherein the second phase plug further comprises a lower boss protruding upward from an upper surface of the second phase plug, and wherein each of the upper boss and the lower boss has a hole through which a fastening member passes.

11. The speaker of claim 10, wherein at least a part of the upper boss is inserted into the lower boss.

12. The speaker of claim 10, wherein the lower boss has a first width in a circumferential direction of the second phase plug.

13. The speaker of claim 10, wherein the second phase plug has a hole into which a part of the diaphragm is inserted, wherein one end of the lower boss is spaced apart from the hole by a first distance and has a first width in a circumferential direction of the second phase plug, and wherein the other end of the lower boss is spaced apart from the hole by a second distance greater than the first distance and has a second width smaller than the first width in a circumferential direction of the second phase plug.

14. The speaker of claim 10, wherein a cross section of the lower boss comprises a circular shape.

15. The speaker of claim 1, wherein the diaphragm has a dome shape.

16. The speaker of claim 1, wherein the guide path comprises a continuous open path surrounding the side surface of the speaker enclosure.

17. The speaker of claim 1, wherein the side surface of the speaker enclosure is substantially parallel to the top surface so the generated sound waves are guided by the guide path to be emitting horizontally in all directions around the speaker.

* * * * *